United States Patent [19]

Han

[11] Patent Number: 4,967,213
[45] Date of Patent: Oct. 30, 1990

[54] FILM ADVANCING AND REWINDING DEVICE FOR A CAMERA

[75] Inventor: Seong-sook Han, Changwon, Rep. of Korea

[73] Assignee: Samsung Aerospace Industries, Ltd., Rep. of Korea

[21] Appl. No.: 307,961

[22] Filed: Feb. 9, 1989

[30] Foreign Application Priority Data

Feb. 11, 1988 [KR] Rep. of Korea .................. 88-1626

[51] Int. Cl.⁵ ........................................... G03B 1/12
[52] U.S. Cl. .............................. 354/173.1; 354/204; 354/214; 242/71.6
[58] Field of Search ................ 354/173.1, 204, 212, 354/214; 242/71.6

[56] References Cited

U.S. PATENT DOCUMENTS

| | | | |
|---|---|---|---|
| 4,401,377 | 8/1983 | Sato et al. | 354/214 |
| 4,482,226 | 11/1984 | Tamamura | 242/71.6 |
| 4,589,604 | 5/1986 | Yagi et al. | 242/71.6 |
| 4,821,059 | 4/1989 | Nakanishi et al. | 354/214 |

FOREIGN PATENT DOCUMENTS 59-143132  8/1984  Japan .

*Primary Examiner*—A. A. Mathews
*Attorney, Agent, or Firm*—Leydig, Voit & Mayer

[57] ABSTRACT

A film advancing and rewinding device for a camera which reduces the number of parts to nearly one-half those in a conventional film advancing and rewinding device. The device includes a film take-up spool, a reversible motor installed inside the spool and provided with built-in reduction gears for rotating the spool, a group of gears for transmitting rotational force from the spool to a sprocket engaging film, and a rotational force disconnecting mechanism located in said group of gears which disconnects the rotational force from the spool to the sprocket when film is rewound or when the rotational speed of the sprocket by movement of the film is faster than that produced by the group of gears.

5 Claims, 5 Drawing Sheets

FILM ADVANCING AND REWINDING DEVICE FOR A CAMERA

FIELD OF THE INVENTION

The present invention relates to a film advancing and rewinding device incorporated in a camera, especially to a device which can automatically advance and rewind film and cock a shutter by means of a simple transmission mechanism.

BACKGROUND OF THE INVENTION

In a medium size camera popularly used recently, film advancing, rewinding, and the shutter cocking can be accomplished by a built-in motor. Sometimes an automatic focus control function and/or an automatic exposure control function are added. Such fully automatic functions are applied even to large size camera.

A known film advancing and rewinding device of cameras will now be examined in detail. The known device consists of more than a hundred parts in which an electromotive film advancing element for advancing film frame by frame when taking a picture and an electromotive film rewinding element for rewinding film back into a film magazine after using a roll of film completely includes a unidirectional motor and a group of reduction gears. The rotational force transferring means transmitting the rotational force from the motor to the electromotive film advancing element or to the electromotive film rewinding element is provided between the group of reduction gears and the film advancing and rewinding element.

In the known device, the sequence of the driving force transmission and the operation of related elements linked to it during the film advancing are as follows. The driving force is transmitted from the driving motor via the group of reduction gears and the driving force transferring element to a spool to wind the film around the periphery of the spool frame by frame each time the shutter is actuated. As the film is wound, a fed frame counter is rotated by a designated angle by a sprocket engaged with and moved by perforations in the upper and lower sides of the film. At the same time, the shutter is cocked for taking a picture.

In the film rewinding, the driving force is transmitted from the driving motor via the group of reduction gears, the driving force transferring element, and a group of rewinding gears to a rewinding fork. As the bobbin of the film magazine is rotated by the rewinding fork, the film is rewound to the original state the sprocket is rotated in the opposite direction from advancing operation, and the frame counter returns to its original state.

The known film advancing and rewinding device as described above comprises too many parts and complicated organized gears which transfer the rotating force from the driving motor to the film advancing element or the film rewinding element. Therefore, the assembly of the device requires a very long time and the production cost thereof is high. Furthermore, the malfunction rate of the device is high because of the large number of parts.

SUMMARY OF THE INVENTION

Accordingly, the object of the present invention is to provide a film advancing and rewinding device for a camera which improves the reliability of the camera and reduces the production cost thereof by using fewer parts than those of the known device and which is easily manufactured and assembled.

To accomplish the above mentioned object, the present device comprises a film winding spool a motor installed within the film winding spool to rotate the said spool directly and including built-in reduction gears, a toothed belt for rotating a film rewinding fork inserted into the bobbin of a film magazine in response to rotation of the spool, a sprocket which for engaging perforations in film extending from the film magazine to the periphery of the spool, a group of gears for transmitting rotational force from the spool to the sprocket, a rotational force disconnecting means located in the group of gears for disconnecting the rotational force from the said spool to the said sprocket when the film is rewound or when the rotational speed of the sprocket by film movement is faster than that by the said group of gears, and a film advancing and shutter cocking means for advancing the film a fixed length and cocking a shutter.

The film advancing device of the present invention prevents, by releasing the spool by means to the rotational force disconnecting means, damage of the group of gears or film which may otherwise occur when the film is rewound or when film moving speed increases due to the increasing diameter of the film wound around the spool. Furthermore, since the film advancing and shutter cocking means simultaneously advances a fixed length of film and cocks the shutter to set for taking the camera picture, the construction of the camera is remarkably simple.

BRIEF DESCRIPTION OF THE DRAWINGS

The present invention will now be described in more detail with reference to a preferred embodiment thereof illustrated in the accompaning drawings.

DESCRIPTION OF THE PREFERRED EMBODIMENT

Figure 1:
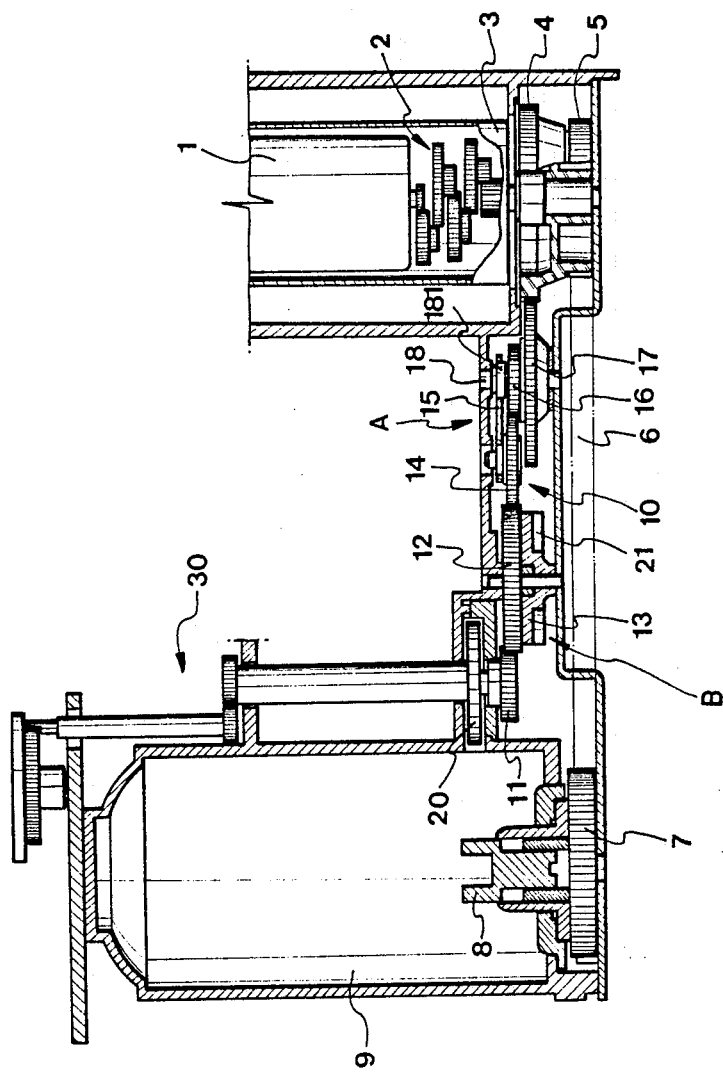
FIG. 1 is a schematic sectional side view of a film advancing and rewinding device in accordance with the present invention.
Figure 2:
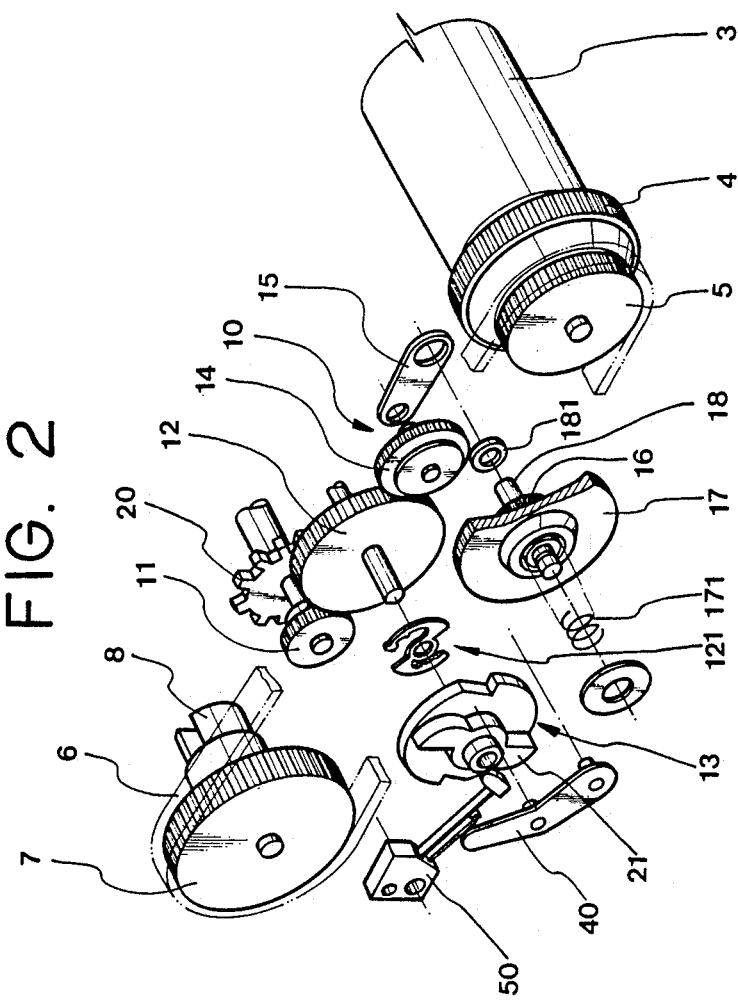
FIG. 2 is a partially-sectioned exploded partial bottom view of the device shown in FIG. 1.

FIG. 1 and FIG. 2 show respectively a schematic side view and an exploded partial bottom view of a film advancing and rewinding device in accordance with the present invention. A driving motor (1) comprises a geared motor including a group of reduction gears (2), all disposed within a film take-up spool (3) to rotate the spool directly. Under the spool (3) are positioned a transmitting gear (4) and a belt gear (5) which rotate simultaneously with the spool (3). The transmitting gear (4) engages a group of gears (10) to be described below and the belt gear (5) engages a toothed belt (6) to transmit a driving force to another belt gear (7) attached to the lower part of a film rewinding fork (8). The fork is positioned inside a film magazine receptacle for receiving a film magazine (60) shown at the left side of FIG. 1. Sprocket (20) is disposed at the right side of receptacle (9). The upper part of the sprocket engages a fed frame counter gear (30) and the lower part of the sprocket engages a sprocket gear (11) that engages the group of gears (10) for transmitting a rotational force from the spool (3) to the sprocket (20).

The group of gears (10) is now described in more detail with reference to power transmission. A first reduction gear (16) is coaxially mounted on a shaft (18) with a first gear (17) which engages the transmitting gear (4) of the spool (3). The first reduction gear (16) engages a planetary gear (14). A cocking gear (12) engages the sprocket gear (11) and the planetary gear (14).

The group of gears (10) includes a rotational force disconnecting means for disconnecting rotational force of from the driving motor (1) when the film is rewound or when the rotational speed of the sprocket gear (11) is faster than that of the planetary gear (14). The disconnecting means also includes a film advancing and shutter cocking means for advancing a fixed length of film and simultaneously cocking a shutter.

Figure 3:
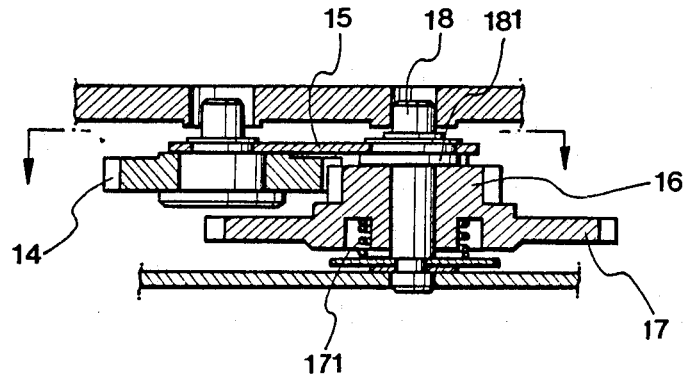
FIG. 3 is an enlarged sectional side view of the part A as indicated in FIG. 1.

The rotational force disconnecting means is constructed as follows. The shaft of the planetary gear (14) shaft (18) of the first gear (17) and the first reduction gear (16) is rotatably mounted in another hole in the link lever (15). A compression spring (171) is installed beneath the first gear (17) as shown in FIG. 2 and FIG. 3, i.e, around the shaft (18) on the opposite side of the first reduction gear (16) from the link lever (15). Consequently, a surface of the first reduction gear (16) is used in contact with a surface of the link lever (15). Accordingly, the link lever (15) is rotated by the rotation of the first gear (17) and the first reduction gear (16) due to the frictional force between the first gear (17) and the link lever (15). According to the direction of the rotation of the link lever (15) the planetary gear (14) engages or disengages the cocking gear (12).

The film advancing and shutter cocking means is constructed as follows. As shown in FIG. 1, FIG. 2, and FIG. 5 to FIG. 7, a cocking cam (13) is rotatably mounted on the shaft (12a) of the cocking gear (12). The rotation of the cocking cam (13) actuates a shutter charging lever (40) to cock the shutter and opens or closes a motor driving switch (50) to advance a fixed length of film.

Figure 7:
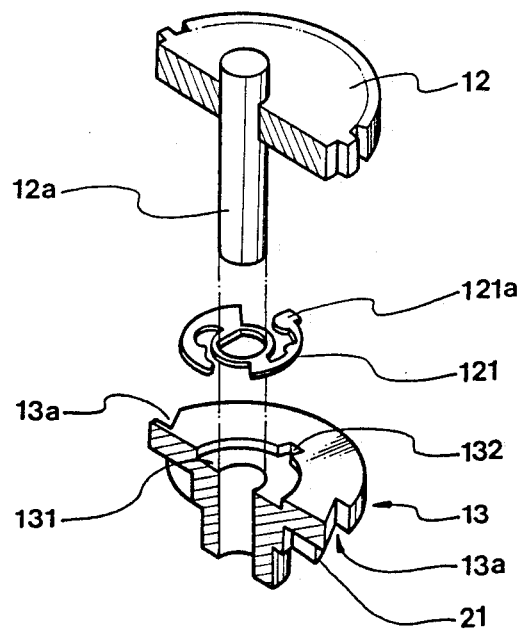
FIG. 7 is a partially-sectioned exploded partial view of the cocking cam and gear shown in FIG. 6.
Figure 8:
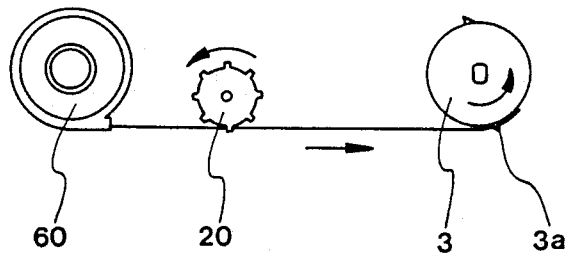
FIG. 8 is a plan view showing film from a film magazine being wound around a take-up spool.

The cocking gear (12) and the cocking cam (13) are preferably assembled with a unidirectional ratchet so as not to cock the shutter or hinder the driving motor (1) from actuating. In more detail, as shown in FIG. 7 it is preferable to form a unidirectional clutch in which a recess (131) having a locking slot (132) is formed at the upper surface of the charge cam (13) and an elastic pawl (121) with a projection (121a) for unidirectionally locking in the locking slot (132) is fixedly mounted on the shaft (12a) of the cocking gear (12).

Figure 6:
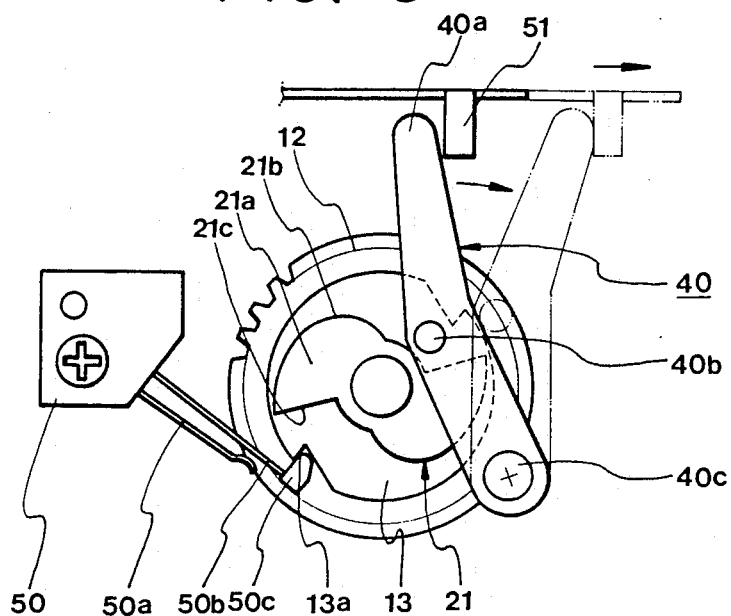
FIG. 6 is a bottom view schematically illustrating the operation of a cocking cam located in the part B as indicated in FIG. 1 and FIG. 5.

As shown in FIG. 6, two notches (13a) are formed at two sides of the outer periphery of the cocking cam (13) and the first contact lever (50a) and the second contact lever (50b) with a head (50c) for engaging one of the notches (13a) extend from the motor driving switch (50). The head (50c) of the second contact lever (50b) is urged into contact with the outer periphery of the cocking cam (13) and the first contact lever (50a). The second contact lever (50b) act as a switch that is normally open and is closed when the head (50c) is displaced from the notch by the rotation of the cocking cam (13). The closing of the switch (50) advances a certain length of the film.

A second cam (21) for shutter cocking is mounted on the shaft (12a) adjacent the side of the cocking cam (13) toward the bottom of FIG. 1. The second cam (21) includes two arms (21a), each of which has a convex portion (21b) and a straight portion (21c). A projection (40b) from the shutter cocking lever (40) is disposed for contacting the arms (21a). The shutter cocking lever (40) pivots round the shaft (40c). An end portion (40a) of the shutter cocking lever (40) contacts and moves a lever (51) of the shutter cocking mechanism.

The operation of the device constructed as mentioned above according to the present invention will now be described step by step. When viewed from above, i.e., from the top of FIG. 1, counterclockwise rotation of the spool (3) by the driving motor (1) results in film advance and clockwise rotation results in film rewinding. In more detail, as the spool (3) is rotated counterclockwise, the perforations of the film engage the projections (3a) of the take-up spool (3), the film is pulled and unwound from the magazine (60) and wound around the outer periphery of the spool (3). At the same time, the sprocket (2), whose teeth engage the perforations of the film and the advanced film counter gear (30) are rotated. Simultaneously, the film rewinding fork (8) engaging the toothed belt (6) is rotated in the direction of movement of the film. The sprocket (20) is also rotated by the spool (3) and the group of gears (10).

However, if the rotational speed of the sprocket (20) caused by the film advance is faster than the rotational speed produced by the group of gears (10) due to an increase in the diameter of the film wound on the spool (3), the rotational force from the spool (3) is automatically disconnected by the rotational force disconnecting means. Describing it in more detail, the rotation of the sprocket (20) forced by the advance of the film is transmitted to the cocking gear (12) via the sprocket gear (11) which is coaxial with the sprocket (20) thereby, the cocking gear (12) rotates clockwise in FIG. 4. The planetary gear (14) engaging the cocking gear (12) is rotated by the rotational force transmitted via the transmitting gear (4), the first gear (17), and the first reduction gear (16) in turn. At this time, the first reduction gear (16) rotates clockwise in FIG. 4. Consequently, the link lever (15) pivots clockwise to bring the planetary gear (14) into contact with the cocking gear (12). Eventually the cocking gear (12) and the planetary gear (14) are engaged and rotate at the same time.

Since the cocking gear (12) pivots the planetary gear (14) slightly counterclockwise and transmits the rotational force when the rotational linear speed difference occurs the planetary gear (14) disengaged (indicated by a phantom line in FIG. 4) and the transmission of the rotational force to the cocking gear (12) is interrupted. As a result, the sprocket (20) is rotated only by the winding of the film and, therefore. No abrupt interference takes place in the group of gears (10).

Figure 5:
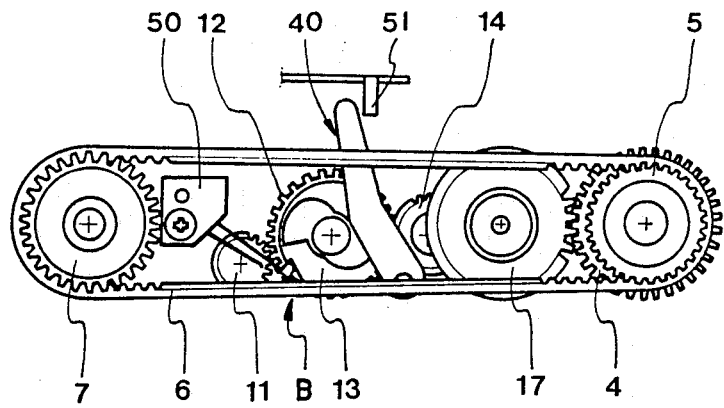
FIG. 5 is a bottom view of the device shown in FIG. 1.

On the other hand, when the advance of a certain length of the film and the cocking of the shutter are carried out at the same time, as shown in FIG. 5 and FIG. 6, the cocking cam (13) rotates clockwise. While the motor driving switch (50) is on, that is to say, while the second contact lever (50b) is in contact with the first contact lever (50a) as a result of the head (50c) contacting with the outer periphery of the cocking cam (13), the advance of a certain length of film is accomplished. Once the cocking cam (13) rotates a half turn and the head (50c) contacts the notch (13a), the motor driving switch (50) is open, that is to say, the driving motor (1) and the spool (3) do not rotate, and consequently the film advance is stopped.

At the same time, the convex portion (21b) of one arm (21a) of the second cam (21) formed as a part of the charge cam (13) pushes the projection (40b) of the shutter cocking lever (40), and the shutter cocking lever (40) pivots around the shaft (40c) as indicated by a phantom line to push the lever (51) of the shutter cocking portion to cock the shutter as shown in FIG. 6. Thus all the mechanisms are prepared for taking a photograph.

Figure 4:
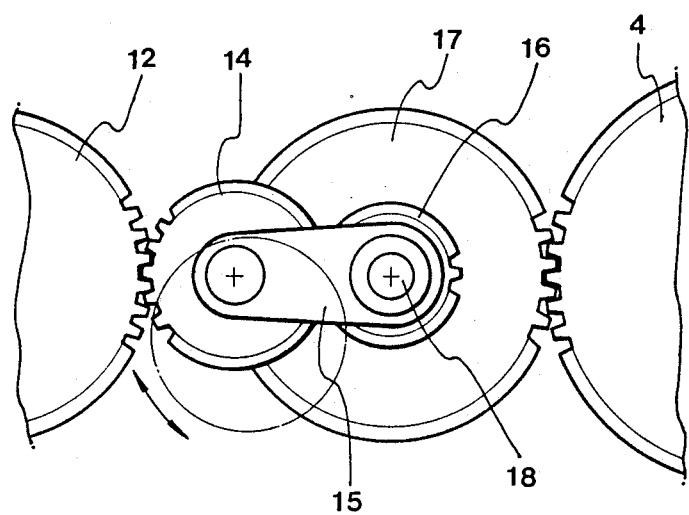
FIG. 4 is a plan view of an engaged configuration of the gears shown in FIG. 3.

Next, the film rewinding operation will be explained. In response to a signal of an electronic device portion which is not shown in drawings, the spool (3) is rotated clockwise, when viewed from above, by the driving motor (1). The rewinding fork (8), actuated by the toothed belt (6), is rotated clockwise and at the same time the film is rewound around the bobbin of the magazine (60) mounted on the rewinding fork (8). At this time, the first reduction gear (16) rotates counterclockwise, as shown in FIG. 4. Accordingly, the link lever (15) pivots counterclockwise, and the planetary gear (14) is disengaged from the cocking gear (12).

As the film is rewound around the bobbin of the magazine (60), the sprocket (20) whose projections engage the perforations of the film rotates clockwise, when viewed from above, and according, the frame counting portion (30) rotates reversely to return to the initial state. At this time, even though the cocking gear (12) is rotated by the sprocket gear (11), the cocking cam (13) does not rotate due to the unidirectional ratchet and, therefore the shutter cocking does not occur during film rewinding. On the other hand, since the planetary gear (14) engages the cocking gear (12) when the film is not present, rotational force can be transmitted.

As described above, the parts of the present device are reduced in number to about 70 by introducing a driving motor that can rotate clockwise counterclockwise and has built in reduction gears, the rotational force disconnecting means, the shutter cocking means, and the toothed belt that transmits the rotational force directly to the rewinding fork. By contrast, the known film advancing device wherein the rotational force is transmitted only by an unidirectional motor and numerous gears contains about 120 parts, the manufacturing and assembling process for the device according to the invention. Thus can be accomplished easily and the malfunction rate is low. Accordingly, the film advancing and rewinding device of the present invention reduces the production cost of a camera and increases the reliability of a camera as a precision instrument.

I claim:

1. A film advancing and rewinding device for a camera comprising:
   a film take-up spool;
   a reversible motor and reduction gears engaging the motor, the motor and gears being disposed within the spool for rotating the spool;
   a rotatable geared rewinding fork for engaging a film magazine for rewinding film into the magazine;
   a toothed endless belt engaging the reduction gears and the rewinding fork;
   a rotatable sprocket for engaging perforations of film extending from the film magazine to the spool;
   a group of gears for transmitting rotational force from rotation of the spool to the sprocket;
   rotational force disconnecting means, located in the group of gears for disconnecting rotational force applied by the rotation of the spool to the sprocket when the film is rewound into the magazine and when the rotational speed of the sprocket driven by movement of the film is faster than the rotational speed of the sprocket as driven by the group of gears; and
   film advancing and shutter cocking means for advancing a fixed length of film and cocking a shutter.

2. The film advancing and rewinding device for a camera according to claim 1 wherein the group of gears comprises a transmitting gear disposed on the spool, a first gear engaging the transmitting gear, a first reduction gear coaxially mounted with the first gear, a planetary gear engaging the first reduction gear, a cocking gear engaging the planetary gear, and a sprocket gear engaging the cocking gear and coaxially mounted with the sprocket.

3. The film advancing and rewinding device for a camera according to claim 1 wherein said film advancing and shutter cocking means includes a cocking cam having two oppositely disposed notches and a second cam commonly mounted on a ratcheted shaft for rotation in only one direction, a motor driving switch actuated by rotation of the cocking cam, and a pivoting shutter cocking lever actuated by rotation of the second cam.

4. The film advancing and rewinding device for a camera according to claim 2 wherein the rotational force disconnecting means comprises a link lever, a first shaft rotatably mounted in the link lever on which the planetary gear is fixedly mounted, and a second shaft rotatably mounted in the link lever on which the first gear and the first reduction gear are fixedly mounted and means for urging the first gear and the first reduction gear toward the link lever for rotation of the link lever and the planetary gear in the same direction as the first gear and the first reduction gear.

5. The film advancing and rewinding device for a camera according to claim 2 wherein said film advancing and shutter cocking means includes a cocking cam having two oppositely disposed notches and a second cam commonly mounted on a ratcheted shaft for rotation in only one direction, a motor driving switch actuated by rotation of the cocking cam, and a pivoting shutter cocking lever actuated by rotation of the second cam.

* * * * *